United States Patent
Sakakibara et al.

(10) Patent No.: US 10,099,643 B2
(45) Date of Patent: Oct. 16, 2018

(54) VEHICLE OCCUPANT PROTECTING DEVICE

(71) Applicant: TOYOTA JIDOSHA KABUSHIKI KAISHA, Toyota-shi, Aichi-ken (JP)

(72) Inventors: Kosuke Sakakibara, Toyota (JP); Masanobu Ohmi, Kasugai (JP); Seiji Yamamoto, Seto (JP); Yoshiaki Matsumura, Toyota (JP); Kazuki Sugie, Miyoshi (JP); Misato Kinoshita, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/457,208

(22) Filed: Mar. 13, 2017

(65) Prior Publication Data
US 2017/0334385 A1    Nov. 23, 2017

(30) Foreign Application Priority Data
May 19, 2016    (JP) ................................. 2016-100801

(51) Int. Cl.
*B60R 21/16*    (2006.01)
*B60R 21/207*    (2006.01)
(Continued)

(52) U.S. Cl.
CPC ............. *B60R 21/207* (2013.01); *B60N 2/68* (2013.01); *B60R 21/233* (2013.01);
(Continued)

(58) Field of Classification Search
CPC ...... B60R 21/207; B60R 21/233; B60R 21/26; B60R 2021/0018; B60R 2021/0048; B60R 2021/23316; B60R 2021/2612
(Continued)

(56) References Cited

U.S. PATENT DOCUMENTS

| 6,523,892 B1 | 2/2003 | Kage et al. |
| 7,878,531 B2 * | 2/2011 | Sugimoto ............. B60R 21/207 |
| | | 280/730.1 |

(Continued)

FOREIGN PATENT DOCUMENTS

| JP | 2000-344044 A | 12/2000 |
| JP | 2001-026232 A | 1/2001 |

(Continued)

*Primary Examiner* — Toan C To
(74) *Attorney, Agent, or Firm* — Oliff PLC

(57) ABSTRACT

A vehicle occupant protecting device including: an airbag that is accommodated at an upper portion of a vehicle seat, that receives a supply of gas from an inflator and is inflated and expanded toward a seat front side, and that includes a front inflating portion, which is inflated at a seat front side with respect to a head portion of a vehicle occupant, and a pair of left and right lateral inflating portions, which are connected to the front inflating portion and are inflated at sides of the seat with respect to the head portion, the airbag being structured as an integral bag body that covers the head portion; and reinforcing portions that extend in a seat vertical direction at an interior of a seatback, and that connect an upper portion and a lower portion of a seatback frame that structures a frame of the seatback.

7 Claims, 10 Drawing Sheets

(51) Int. Cl.
*B60N 2/68* (2006.01)
*B60R 21/231* (2011.01)
*B60R 21/237* (2006.01)
*B60R 21/233* (2006.01)

(52) U.S. Cl.
CPC ...... *B60R 21/237* (2013.01); *B60R 21/23138* (2013.01); *B60R 2021/2074* (2013.01); *B60R 2021/23146* (2013.01); *B60R 2021/23308* (2013.01)

(58) Field of Classification Search
USPC ............................... 280/730.2, 743.1, 743.2
See application file for complete search history.

(56) References Cited

U.S. PATENT DOCUMENTS

| | | | | |
|---|---|---|---|---|
| 8,590,979 | B2* | 11/2013 | Matsumoto | B60N 2/4228 297/216.13 |
| 8,668,225 | B2* | 3/2014 | Yamaki | B60N 2/4235 280/730.2 |
| 9,365,180 | B2* | 6/2016 | Acker | B60R 21/207 |
| 9,533,651 | B1* | 1/2017 | Ohno | B60R 21/23138 |
| 9,919,673 | B2* | 3/2018 | Ohno | B60R 21/207 |
| 9,925,943 | B2* | 3/2018 | Ohno | B60R 21/207 |
| 2010/0237596 | A1* | 9/2010 | Sugimoto | B60R 21/207 280/743.1 |
| 2013/0015642 | A1 | 1/2013 | Islam et al. | |
| 2013/0093224 | A1* | 4/2013 | Dainese | B60R 21/207 297/216.12 |
| 2014/0300088 | A1* | 10/2014 | Fukawatase | B60R 21/13 280/729 |
| 2014/0327234 | A1* | 11/2014 | Heurlin | B60R 21/207 280/730.1 |
| 2016/0121839 | A1* | 5/2016 | Ko | B60R 21/233 280/730.1 |
| 2016/0200232 | A1 | 7/2016 | Tamura et al. | |
| 2016/0347272 | A1* | 12/2016 | Kato | B60R 21/207 |

FOREIGN PATENT DOCUMENTS

| | | |
|---|---|---|
| JP | 2004-017927 A | 1/2004 |
| JP | 2007-230396 A | 9/2007 |
| JP | 2013-018378 A | 1/2013 |
| JP | 2015-044502 A | 3/2015 |

* cited by examiner

VEHICLE OCCUPANT PROTECTING DEVICE

CROSS-REFERENCE TO RELATED APPLICATION

This application is based on and claims priority under 35 USC 119 from Japanese Patent Application No. 2016-100801 filed on May 19, 2016, the disclosure of which is incorporated by reference herein.

BACKGROUND

Technical Field

The present disclosure relates to a vehicle occupant protecting device.

Related Art

Japanese Patent Application Laid-Open (JP-A) No. 2000-344044 discloses an airbag device in which, at the time of a collision, gas of an inflator is supplied through a gas supplying pipe, which is fixed to a seatback, to a bag that is mounted to the gas supplying pipe, and the bag is inflated so as to cover the front and sides of a vehicle occupant. Further, JP-A No. 2013-018378 discloses an airbag device in which airbags are inflated toward the front from the left and right end portions of a headrest and join together in front of the head portion of a vehicle occupant, and, on the other hand, an auxiliary airbag is inflated forward from the central portion of the headrest of the seat and joins the pair of airbags. Moreover, U.S. Patent Publication No. 2013/0015642 discloses a structure in which a hood is accommodated at the interior of a cover that is provided at the upper portion of a seatback, and the upper body of a vehicle occupant is covered due to the hood receiving a supply of gas from an inflator and being expanded.

In the structure of JP-A No. 2000-344044, because the gas supplying pipe is provided on the seatback, the appearance is unattractive. Similarly, in the structure of U.S. Patent Publication No. 2013/0015642, the inflator and the cover are exposed, and the appearance is unattractive. On the other hand, in the structure of JP-A No. 2013-018378, it is difficult to ensure of the joining strength of the pair of airbags for the head portion, which are joined together after the inflation and expansion, and the joining strength of the auxiliary airbag for the head portion with respect to the pair of airbags for the head portion.

As a countermeasure to these problems, it has been thought to employ a structure in which an airbag is accommodated in the upper portion of a vehicle seat, and, by inflating and expanding this airbag toward the seat front side, the head portion of a vehicle occupant is covered from the seat front side and the left and right both sides. Here, when the airbag inflates and expands, the airbag is inflated and expanded toward the seat front side due to reaction force being applied from the headrest or the seatback toward the airbag.

Therefore, there is the possibility that, when the airbag inflates and expands, the seatback will be displaced toward the seat rear side, and there is room for improvement.

SUMMARY

In view of the above-described circumstances, the present disclosure provides a vehicle occupant protecting device that, in a structure in which an airbag is accommodated in the upper portion of a vehicle seat, can suppress displacement of a seatback toward the seat rear side when the airbag inflates and expands.

A vehicle occupant protecting device of a first aspect of the present disclosure includes: an airbag that is accommodated at an upper portion of a vehicle seat, and that receives a supply of gas from an inflator and is inflated and expanded toward a seat front side, and that includes a front inflating portion, which is inflated at a seat front side with respect to a head portion of a vehicle occupant, and a pair of left and right lateral inflating portions, which are connected to the front inflating portion and are inflated at sides of the seat with respect to the head portion, the airbag being structured as an integral bag body that covers the head portion; and reinforcing portions that extend in a seat vertical direction at an interior of a seatback, and that connect an upper portion and a lower portion of a seatback frame that structures a frame of the seatback.

In the vehicle occupant protecting device of the first aspect of the present disclosure, the airbag is accommodated in the upper portion of the vehicle seat. Further, this airbag receives a supply of gas from the inflator, and is inflated and expanded toward the seat front side. The airbag includes the front inflating portion and the pair of left and right lateral inflating portions, and is structured as an integral bag body that covers the head portion of the vehicle occupant. Due thereto, movement of the head portion of the vehicle occupant is limited by the airbag in collisions of various forms, and the vehicle occupant is protected.

Further, the reinforcing portions, which extend in the seat vertical direction and connect the upper portion and the lower portion of the seatback frame, are provided at the interior of the seatback. Due thereto, the load, which is applied from the airbag to the upper portion of the vehicle seat at the time of inflation and expansion of the airbag, can be transmitted well via the reinforcing portions to the lower portion of the seatback frame, and displacement of the seatback toward the seat rear side can be suppressed.

In a vehicle occupant protecting device of a second aspect of the present disclosure, in the structure of the first aspect, the seatback frame is structured to include a pair of side frames, which are disposed with an interval therebetween in a seat transverse direction and which extend in the seat vertical direction, and an under frame that connects lower end portions of the side frames together in the seat transverse direction, and lower portions of the reinforcing portions are connected to connected portions of the side frames and the under frame.

In the vehicle occupant protecting device of the second aspect of the present disclosure, the load that is inputted to the reinforcing portions can be transmitted well to the side frames and the under frame.

In a vehicle occupant protecting device of a third aspect of the present disclosure, in the structure of the second aspect, each of the side frames and the reinforcing portions is structured to include a bottom wall and a pair of side walls that extend-out from both end portions of the bottom wall, and the inflator is disposed within a cross-section that is surrounded by the bottom wall and the pair of side walls at the side frame, or within a cross-section that is surrounded by the bottom wall and the pair of side walls at the reinforcing portion.

In the vehicle occupant protecting device of the third aspect of the present disclosure, as compared with a structure in which the inflator is disposed within the headrest, the position of the inflator is lower, and therefore, the center of gravity of the vehicle seat overall can be lowered. Due thereto, the moment around the connected portion of the seatback and the seat cushion is small, and displacement of the seatback toward the seat rear side at the time of inflation and expansion of the airbag can be suppressed. Further, due to the inflator being disposed within the cross-section of the side frame or within the cross-section of the reinforcing portion, the reaction force that is applied to the inflator at the time when the gas is jetted-out can be received by the side frame or the reinforcing portion.

In a vehicle occupant protecting device of a fourth aspect of the present disclosure, in the structure of the third aspect, the inflator is disposed further toward a seat lower side than the airbag, and a gas jetting port is provided at a seat upper side end portion of the inflator.

In the vehicle occupant protecting device of the fourth aspect of the present disclosure, due to the gas jetting port being provided at the seat upper side end portion of the inflator, the gas that is jetted-out from this gas jetting port can be supplied smoothly to the airbag that is disposed at the seat upper side of the inflator.

In a vehicle occupant protecting device of a fifth aspect of the present disclosure, in the structure of any one of the first through fourth aspects, the airbag is accommodated within a headrest, headrest supports that support the headrest are provided at an upper portion of the seatback frame, and upper end portions of the reinforcing portions are connected to the headrest supports.

In the vehicle occupant protecting device of the fifth aspect of the present disclosure, the load, which is applied to the headrest at the time of inflation and expansion of the airbag, can be transmitted well through the headrest supports to the reinforcing portions.

As described above, the vehicle occupant protecting device of the first aspect of the present disclosure has the excellent effect that, in a structure in which an airbag is accommodated in the upper portion of a vehicle seat, displacement of the seatback toward the seat rear side at the time of inflation and expansion of the airbag can be suppressed.

The vehicle occupant protecting device of the second aspect of the present disclosure has the excellent effect that load that is inputted to the seatback frame can be dispersed effectively.

The vehicle occupant protecting device of the third aspect of the present disclosure has the excellent effect that, as compared with a structure in which an inflator is disposed within a headrest, displacement of the seatback toward the seat rear side at the time of inflation and expansion of the airbag can be suppressed.

The vehicle occupant protecting device of the fourth aspect of the present disclosure has the excellent effect that, as compared with a structure in which a gas jetting port is provided at the seat lower side end portion of an inflator, gas can be supplied efficiently to the airbag.

The vehicle occupant protecting device of the fifth aspect of the present disclosure has the excellent effect that, in a structure in which an airbag is accommodated within a headrest, displacement of the seatback toward the seat rear side at the time of inflation and expansion of the airbag can be suppressed.

BRIEF DESCRIPTION OF THE DRAWINGS

Exemplary embodiments of the present disclosure will be described in detail based on the following figures, wherein.

DETAILED DESCRIPTION

First Embodiment

A vehicle occupant protecting device 10 relating to a first embodiment of the present disclosure is described with reference to the drawings. Note that arrow FR and arrow UP that are shown appropriately in the respective drawings indicate the forward direction (the direction in which a seated person faces) and the upward direction of a vehicle seat 12, respectively. Hereinafter, when merely longitudinal, vertical and left-right directions are used, they refer to the longitudinal of the seat longitudinal direction, the vertical of the seat vertical direction, and the left and right when facing forward in the seat longitudinal direction, unless otherwise indicated. Note that arrow IN that is marked appropriately in the respective drawings indicates the vehicle central side in the vehicle transverse direction at an automobile that serves as the vehicle in which the vehicle seat 12 is installed.

(Schematic Overall Structure of Vehicle Occupant Protecting Device)

Figure 1:
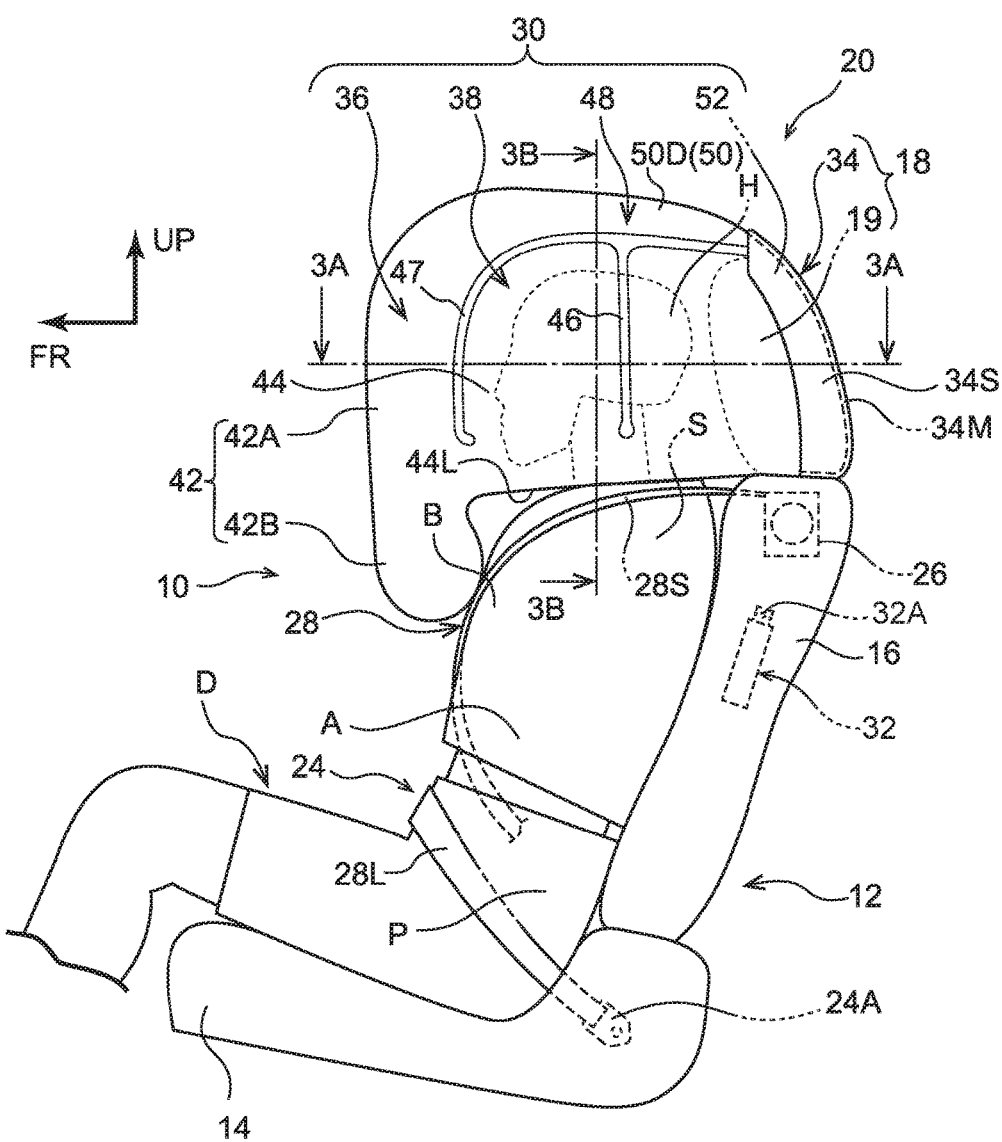
FIG. 1 is a side view schematically showing a mode of protecting a seated person by a vehicle occupant protecting device relating to a first embodiment.
Figure 2:
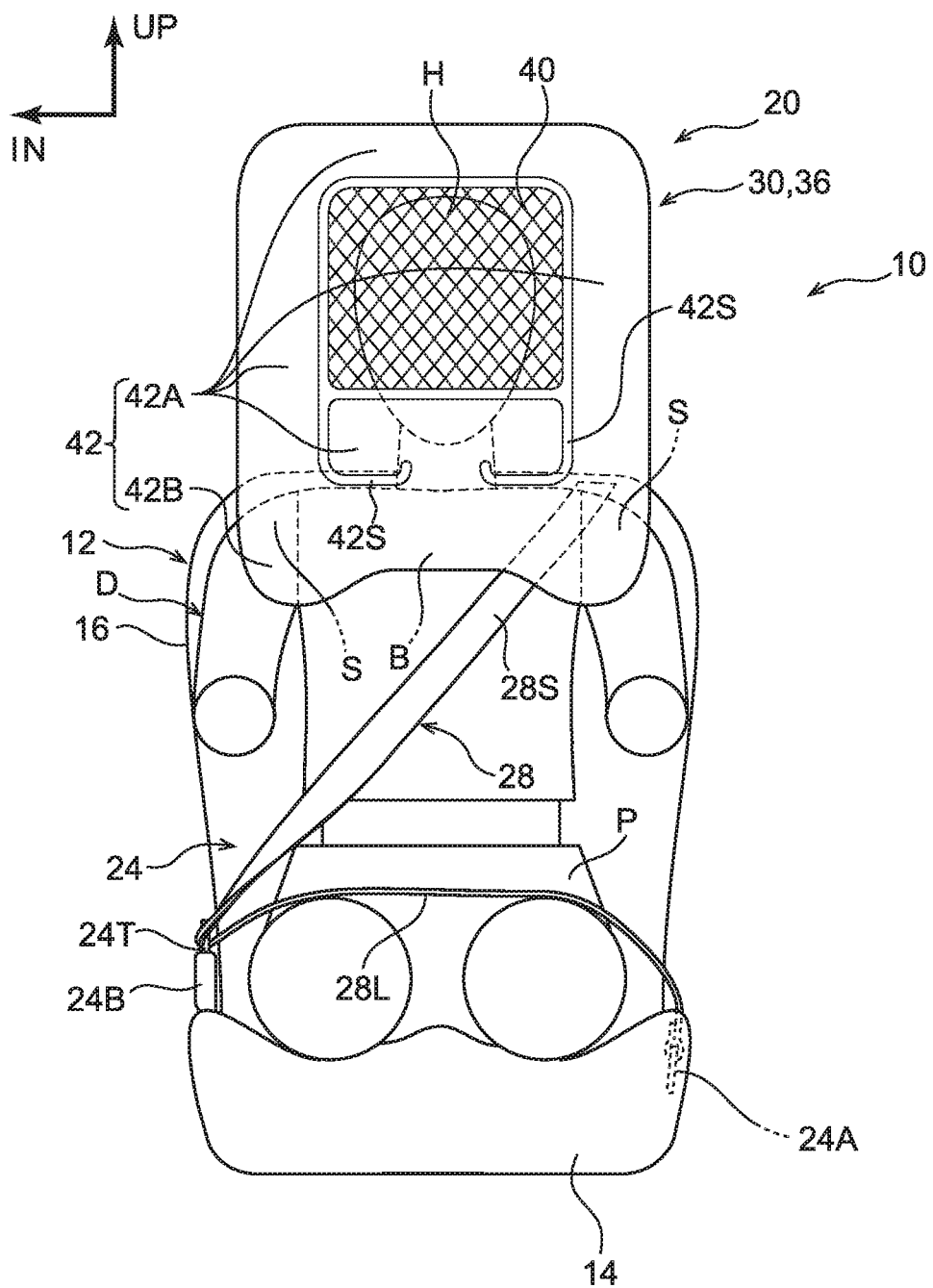
FIG. 2 is a front view schematically showing the mode of protecting the seated person by the vehicle occupant protecting device relating to the first embodiment.

As shown in FIG. 1 and FIG. 2, the vehicle occupant protecting device 10 of the present embodiment is installed in the vehicle seat 12. The vehicle seat 12 is disposed so as to be offset toward either one of the left or the right (toward the left side in the present embodiment) with respect to the vehicle transverse direction center of an unillustrated vehicle body of the automobile. Further, in the present embodiment, the vehicle seat 12 is a driver's seat, and the seat longitudinal direction coincides with the vehicle longitudinal direction, and the seat transverse direction coincides with the vehicle transverse direction. Moreover, the vehicle seat 12 is structured to include a seat cushion 14, a seatback 16 whose lower end is connected to the rear end of the seat cushion 14, and a headrest 18 that is provided at the upper end of the seatback 16.

Note that the respective drawings illustrate a state in which a crash test dummy (mannequin) D is seated on the seat cushion 14 of the vehicle seat 12 as a model of a vehicle occupant who is to be protected. The dummy D is, for example, an AM50 (50th percentile U.S. adult male) World SID (internationally standardized side crash dummy: World Side Impact Dummy). This dummy D is seated in a standard seated posture that is prescribed by crash test methods, and the vehicle seat 12 is positioned at a standard set position that corresponds to the seated posture. Hereinafter, in order to make the explanation easy to understand, the dummy D is called "seated person D".

Figure 4A:
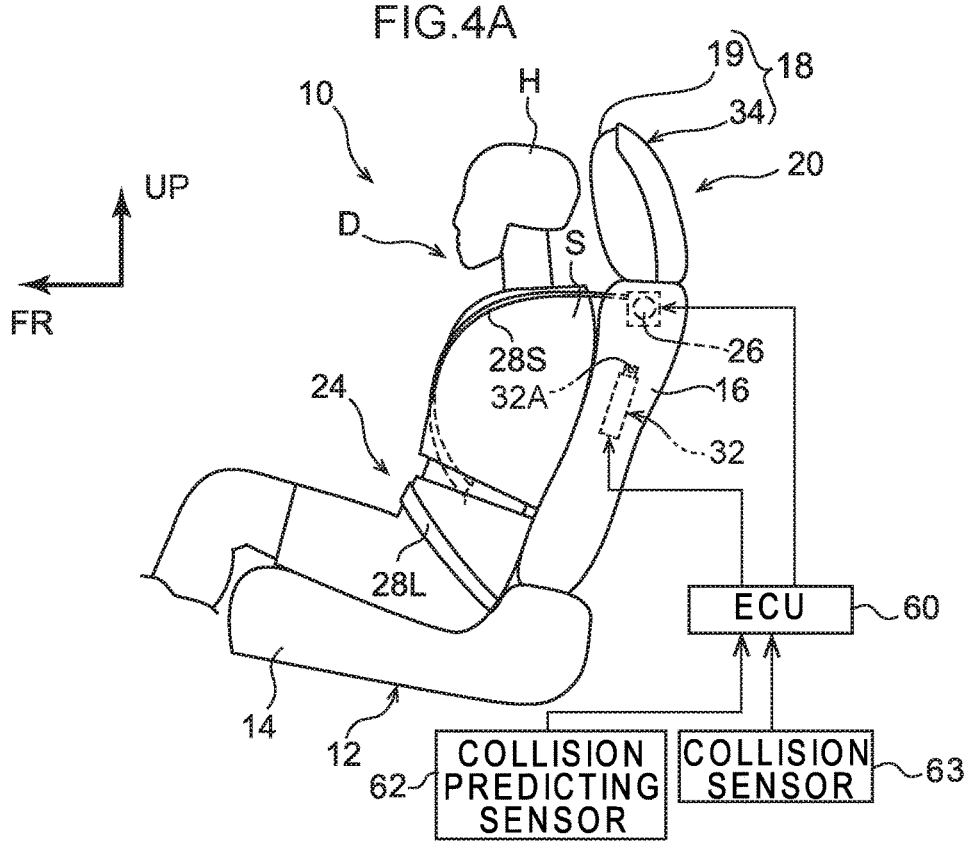
FIG. 4A is a side view showing substantially the entire structure, before operation, of the vehicle occupant protecting device relating to the first embodiment.

The vehicle occupant protecting device 10 is structured to include a multidirectional airbag device 20 for protecting the seated person D from collisions of various forms, a seatbelt device 24, and an ECU (Electronic Control Unit) 60 that serves as a control section (see FIG. 4A). Further, the vehicle occupant protecting device 10 of the present embodiment is structured to include convex beads 72 that serve as reinforcing portions and that are provided at the interior of the seatback 16 (see FIG. 5). Hereinafter, the schematic structures of the seatbelt device 24, the multidirectional airbag device 20 and the ECU 60 are described, and thereafter, a seatback frame 64 that structures the frame of the seatback 16 is described.

(Structure of Seatbelt Device)

The seatbelt device 24 is a three-point seatbelt device. The other end of a belt (a webbing) 28, whose one end is taken-up by a retractor 26 so as to be able to be pulled-out therefrom, is fixed to an anchor 24A. A tongue plate 24T is slidably provided at the belt 28. Due to the tongue plate 24T being anchored at a buckle 24B, the belt 28 is applied to the seated person D. Further, in the state in which the belt 28 is applied to the seated person D, the belt 28 is structured to include a shoulder belt 28S, which extends from the retractor 26 to the tongue plate 24T and restrains the upper body of the seated person D, and a lap belt 28L, which extends from the tongue plate 24T to the anchor 24A and restrains the waist region P of the seated person D.

In the present embodiment, the seatbelt device 24 is a so-called seat-mounted seatbelt device in which the retractor 26, the anchor 24A and the buckle 24B are provided at the vehicle seat 12. Further, the retractor 26 of the present embodiment has a pretensioner that serves as a belt take-up mechanism that, by being operated, forcibly applies tension to the belt 28. The pretensioner is operated by the ECU 60 that is described later.

(Structure of Multidirectional Airbag Device)

As shown in FIG. 1, the multidirectional airbag device 20 is structured to include a multidirectional airbag 30, an inflator 32, and a module case 34 that structures the headrest 18. The multidirectional airbag 30 is folded-up in a state of being connected such that gas can be supplied thereto from the inflator 32, and is accommodated within the module case 34 at the upper portion of the vehicle seat 12. Concrete description thereof is given hereinafter.

(Multidirectional Airbag)

As shown in a plan sectional view in FIG. 3A, the multidirectional airbag 30 is structured as an integral bag body that is inflated and expanded so as to cover a head portion H of the seated person D (hereinafter simply called the "head portion H" upon occasion) from the front and the left and right both sides. Concretely, as shown in FIG. 1 through FIG. 3B, the multidirectional airbag 30 is structured to include a front expanding portion 36 that is expanded in front of the head portion H, and a pair of left and right lateral expanding portions 38 that are expanded at the left and right both sides of the head portion H.

As shown in FIG. 2, the front expanding portion 36 is structured to include a mesh portion 40 that is a see-through structure and is expanded in front of the head portion H, and a front inflating portion 42 that is inflated and expanded so as to surround the mesh portion 40 as seen in a front view. The mesh portion 40 is formed in a substantially rectangular shape as seen in a front view. The front inflating portion 42 is formed in a substantially rectangular frame-shape whose inner peripheral edge is joined to the mesh portion 40. The front inflating portion 42 receives a supply of gas and is inflated and expanded.

Of the front inflating portion 42, the portions that surround the mesh portion 40 mainly above the seatback 16 are first inflating portions 42A that are inflated and expanded in front of the head portion H. Further, of the front inflating portion 42, the portion that is positioned below the first inflating portions 42A (the portion that overlaps the seatback 16 as seen in a front view) is a second inflating portion 42B that is inflated and expanded in front of a chest portion B and shoulder portions S of the seated person D. Gas is supplied to the second inflating portion 42B through the first inflating portions 42A. Note that, in the present embodiment, the portions of the first inflating portions 42A, which portions are positioned below the mesh portion 40, are sectioned-off by seams 42S from the other portions at the first inflating portions 42A, and gas is supplied thereto through the second inflating portion 42B.

Figure 3A:
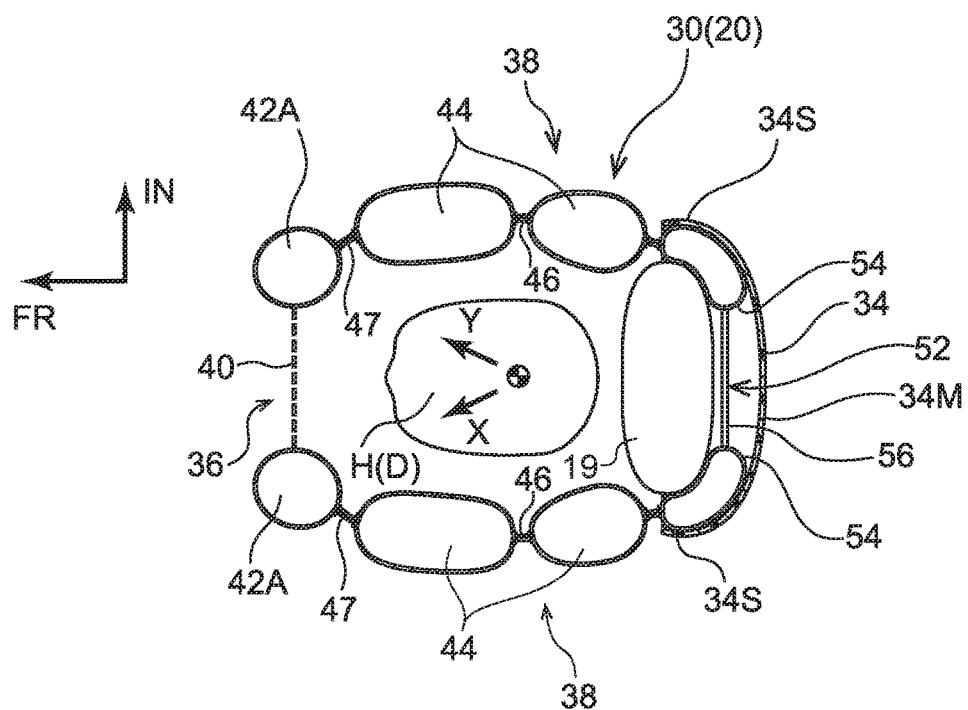
FIG. 3A is a drawing showing an inflated and expanded state of a multidirectional airbag that structures the vehicle occupant protecting device relating to the first embodiment, and is a cross-sectional view along line 3A-3A of FIG. 1.
Figure 3B:
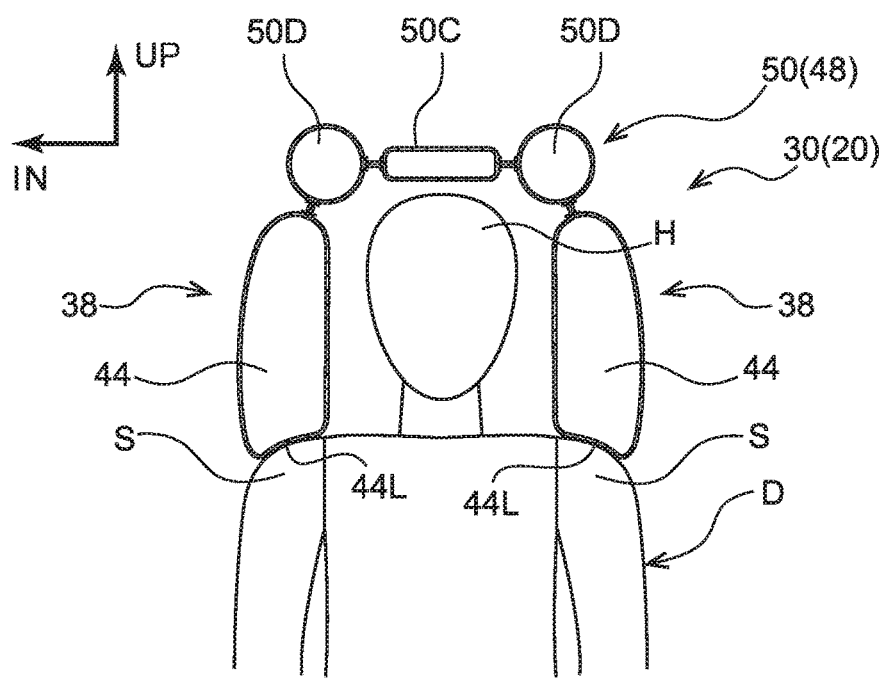
FIG. 3B is a drawing showing the inflated and expanded state of the multidirectional airbag that structures the vehicle occupant protecting device relating to the first embodiment, and is a cross-sectional view along line 3B-3B of FIG. 1.

As shown in FIG. 1 and FIGS. 3A and 3B, the lateral expanding portions 38 are structured to include lateral inflating portions 44 that receive a supply of gas and are inflated and expanded at the sides of the head portion H, and seam portions 46 that serve as non-inflating portions and extend along the vertical direction and section the lateral inflating portions 44 forward and rearward. The lateral inflating portions 44 are a size (a surface area) that overlaps the entire head portion H as seen in a side view. The seam portions 46 section the lateral inflating portions 44 forward and rearward at the portions of the lateral inflating portions 44 that overlap the head portion H.

At the left and right lateral inflating portions 44, the respective front ends thereof are connected, in communicating states, to the lower ends of the first inflating portions 42A at the front inflating portion 42 (are connected in vicinities of the borders of the first inflating portions 42A and the second inflating portion 42B). Due thereto, gas from the inflator 32 is supplied to the left and right lateral inflating portions 44 via the front inflating portion 42, and the left and right lateral inflating portions 44 are thereby inflated and expanded. On the other hand, between the first inflating portions 42A of the front inflating portion 42 and the lateral inflating portions 44, portions above the aforementioned communicating portions are partitioned by seam portions 47 that serve as non-inflating portions.

At the left and right lateral expanding portions 38, lower ends 44L of the respective lateral inflating portions 44 contact upper portions of the shoulder portions S of the seated person D in the state in which the multidirectional airbag 30 is inflated and expanded. This is a structure in which the position, in the vertical direction, of the multidirectional airbag 30 in the inflated and expanded state with respect to (the head portion H of) the seated person is determined by the contact of the lower ends 44L of the lateral inflating portions 44 with the shoulder portions S.

This is a structure in which, at the multidirectional airbag 30, in this positioned state thereof, all of the front expanding portion 36, the left and right lateral expanding portions 38 and an upper expanding portion 48 that is described later do not contact (a gap is formed between them and) the seated person D who is in a usual seated posture.

The multidirectional airbag 30 has the upper expanding portion 48 that connects the respective upper edges of the front expanding portion 36 and the left and right lateral expanding portions 38 and is expanded above the head portion H of the seated person D. The upper expanding portion 48 is structured with the main portion thereof being an upper inflating portion 50 that receives a supply of gas and is inflated and expanded. As shown in FIG. 3B, the upper inflating portion 50 is structured to include a central inflating portion 50C that is inflated and expanded above the head portion H, and a pair of upper duct portions 50D that serve as duct portions and that extend along the longitudinal direction at the left and right of the central inflating portion 50C.

Moreover, the multidirectional airbag 30 has a rear expanding portion 52 that is expanded at the rear of the upper expanding portion 48. As shown in FIG. 3A, the rear expanding portion 52 is structured to include rear duct portions 54 that are inflating portions, and a non-inflating portion 56. The rear duct portions 54 are divided to the left and the right, and the respective upper ends thereof are connected, in communicating states, to the upper duct portions 50D that correspond to the left and the right. The left and right rear duct portions 54 are connected to one another at the non-inflating portion 56 whose front edge is joined to the rear edge of the central inflating portion 50C.

The multidirectional airbag 30 that is inflated and expanded as described above is in and expanded form (a flat pattern), before being folded-up. The multidirectional airbag 30 in its expanded form is formed as an integral bag body by OPW (the abbreviation for One Piece Weaving). Note that the multidirectional airbag 30 may be formed as an integral bag body by a method (cutting and sewing) of sewing together the peripheral edges of two fabrics.

(Inflator)

Figure 5:
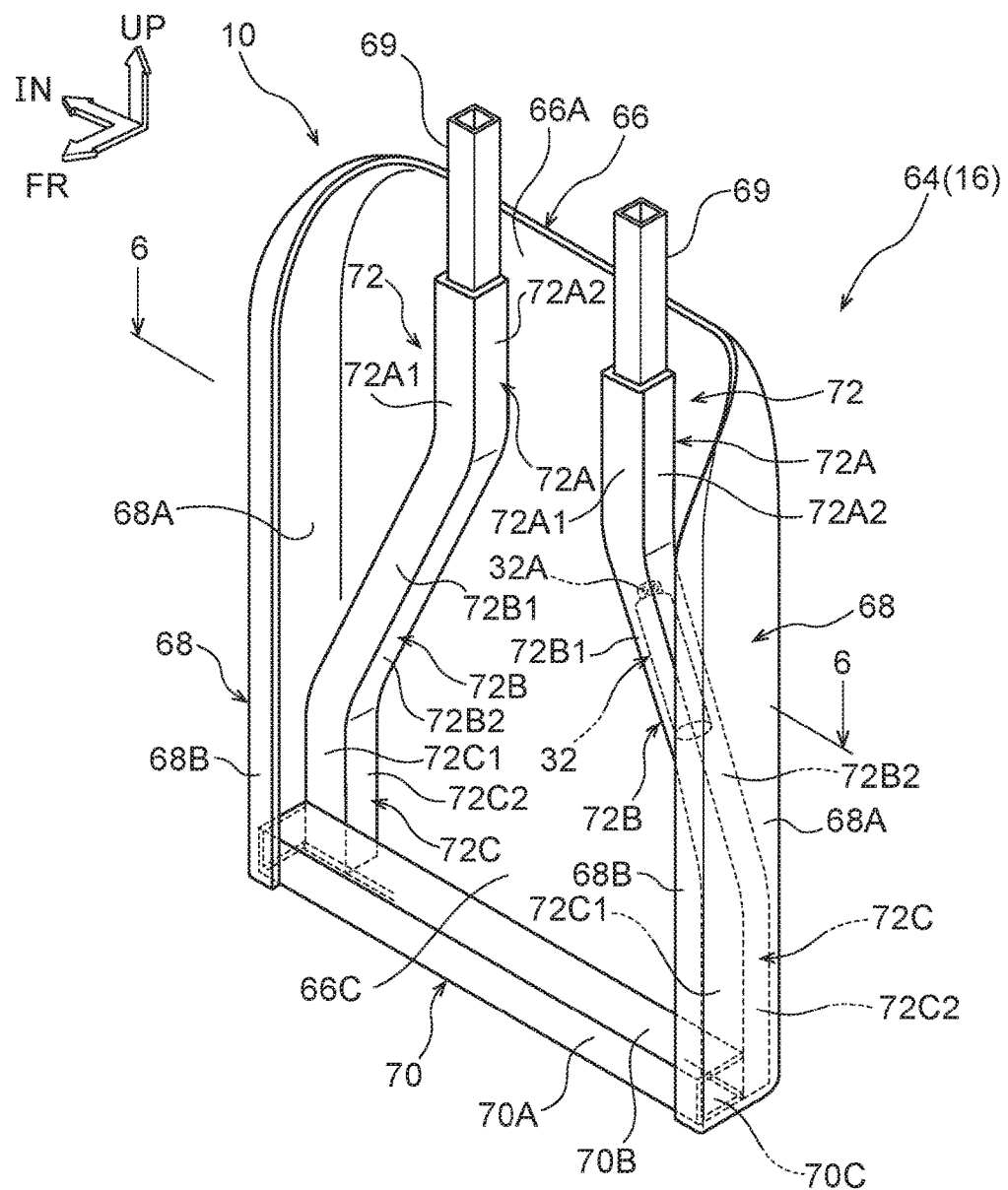
FIG. 5 is a perspective view showing a seatback frame and an inflator that structure the vehicle occupant protecting device relating to the first embodiment.

As shown in FIG. 1, the inflator 32 is a cylinder-type inflator, and is accommodated within the seatback 16. A combustion type inflator or a cold gas type inflator is employed as the inflator 32. The inflator 32 supplies gas, which the inflator 32 generates due to the inflator 32 being operated, into the multidirectional airbag 30. Here, as shown in FIG. 5, the inflator 32 of the present embodiment is disposed within the cross-section of the convex bead 72 that is provided at the seatback frame 64 at the interior of the seatback 16. Further, a gas jetting port 32A is provided at the end portion, which is at the seat upper side, of the inflator 32. Due to the inflator 32 being operated by the ECU 60 that is described later, gas is jetted-out from the gas jetting port 32A. An unillustrated diffuser that structures a flow path of the gas is provided at the gas jetting port 32A. The inflator 32 is connected to the multidirectional airbag 30 via this diffuser. Details of the seatback frame 64 are described later.

(Module Case)

As shown in FIG. 1, the headrest 18 is structured to include a headrest main body 19, and the module case 34 that is disposed at the seat rear side of the headrest main body 19. The headrest main body 19 structures the front portion of the headrest 18, and is disposed at the seat rear side of the head portion H of the seated person D. Further, the headrest main body 19 is mounted to the seatback 16 via unillustrated headrest stays.

On the other hand, the module case 34, which is disposed at the seat rear side of the headrest main body 19, is a backboard that structures (the design of the rear portion of) the headrest 18. Accordingly, the multidirectional airbag 30 is accommodated in the rear portion of the headrest 18.

Figure 4B:
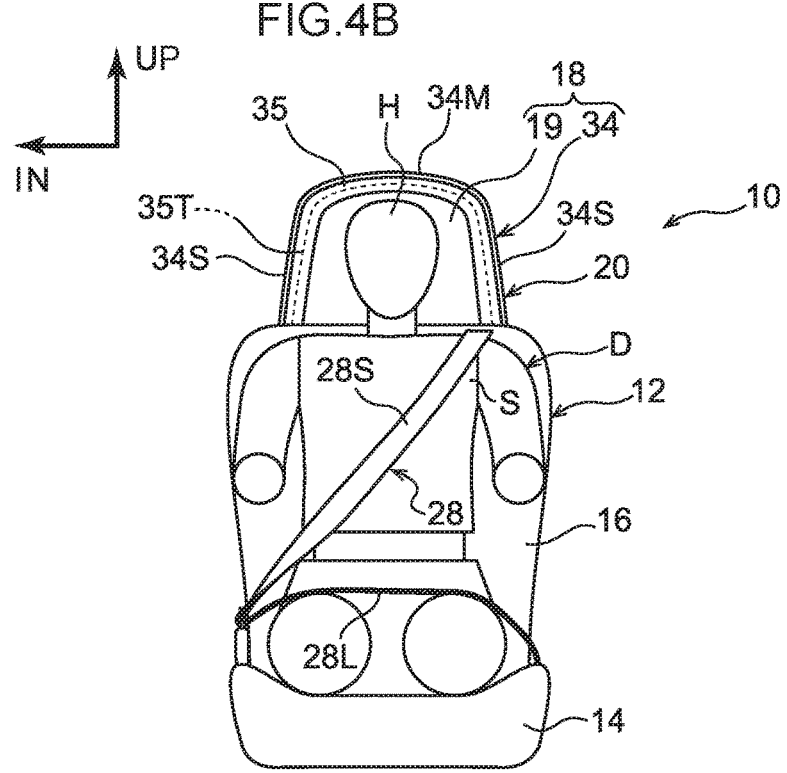
FIG. 4B is a front view showing substantially the entire structure, before operation, of the vehicle occupant protecting device relating to the first embodiment.

As shown in FIG. 4B, as seen in a front view, the module case 34 projects-out further upward than the upper end of the headrest main body 19, and juts-out toward the seat transverse direction both sides with respect to the headrest main body 19. Namely, the module case 34 covers the headrest main body 19 from the rear. In the present embodiment, the module case 34 covers the rear portion of the headrest main body 19 from the upper side and the left and right both sides, and structures the design of the rear portion of the headrest 18.

More concretely, as shown in FIG. 1, the module case 34 is structured with the main portions thereof being a base portion 34B, a main wall 34M, and a pair of left and right side walls 34S. The base portion 34B contacts the upper end of the seatback 16.

The main wall 34M extends-out upward from the rear end of the base portion 34B, and is tilted forward such that the upper end thereof is positioned at the front side with respect to the lower end thereof, and is formed in a curved shape that is convex rearward and upward as seen in a side view. Further, as seen in a front view, the main wall 34M projects-out further upward than the upper end of the headrest main body 19, and juts-out toward the seat transverse direction both sides with respect to the headrest main body 19.

A space, which accommodates the multidirectional airbag 30 that is in a folded-up state, is formed between the main wall 34M and the headrest main body 19. The upper end of the main wall 34M extends to above the headrest 18. This is a structure in which the multidirectional airbag 30 that is in the process of inflating and expanding passes-through between the headrest main body 19 and the upper end portion of the main wall 34M. At the multidirectional airbag 30 that is in the inflated in expanded state, the rear expanding portion 52 passes-through between the headrest main body 19 and the upper end portion of the main wall 34M. Further, at this time, reaction force is applied from the main wall 34M toward the multidirectional airbag 30.

The pair of side walls 34S extend-out toward the front from the seat transverse direction both ends of the main wall 34M, and, as seen in a side view, cover the rear portion of the headrest main body 19. Further, as seen in FIG. 3A, this is a structure in which the lateral expanding portions 38 of the multidirectional airbag 30 that is in an inflated and expanded state (the portions in vicinities of the borders with the rear expanding portion 52) pass between the pair of side walls 34S and the headrest main body 19.

The above-described module case 34 accommodates the multidirectional airbag 30, which is in a folded-up state, between the module case 34 and the headrest main body 19. Further, the multidirectional airbag 30 is rolled outwardly and accommodated within the module case 34. Outward rolling is a form of folding in the shape of a roll from the front end side toward the upper side and the rear side such that the multidirectional airbag 30 is folded-up in the direction opposite the process of expansion.

As shown in FIG. 4B, the region between the module case 34 and the headrest main body 19 is closed by an airbag door 35. This airbag door 35 is structured so as to permit inflation and expansion of the multidirectional airbag 30 toward the front due to the airbag door 35 being ruptured starting at a tear line 35T, which is a weak portion, by the expansion pressure of the multidirectional airbag 30.

(Structure of ECU)

As shown in FIG. 4A, the multidirectional airbag device 20 and the seatbelt device 24 that structure the vehicle occupant protecting device 10 are controlled by the ECU 60. Concretely, the ECU 60 is electrically connected to the inflator 32 of the multidirectional airbag device 20 and to the retractor 26 of the seatbelt device 24. Further, the ECU 60 is electrically connected to a collision predicting sensor 62, such as a pre-crash sensor or the like, and to a collision sensor 63 (or sensor group).

On the basis of a signal from the collision predicting sensor 62, the ECU 60 can predict (the occurrence of or the inevitability of) collisions of various forms with respect to the automobile to which the ECU 60 is applied. When a collision is predicted on the basis of a signal from the collision predicting sensor 62, or when a collision is sensed on the basis of a signal from the collision sensor 63, the ECU 60 operates the pretensioner and operates the inflator 32. Due to the pretensioner being operated, tension is applied to the belt 28, and the seated person D is restrained at the seatback 16. On the other hand, due to the inflator 32 being operated, the multidirectional airbag 30 is inflated and expanded toward the seat front side.

(Structure of Seatback Frame)

The seatback frame 64 that is a main portion of the present embodiment is described next. As shown in FIG. 5, the seatback frame 64 that structures a frame is provided at the interior of the seatback 16.

The seatback frame 64 of the present embodiment is formed of resin, and is structured to include mainly a base plate 66, side frames 68, and an under frame 70. The base plate 66 is a member that is shaped as a flat plate and whose plate thickness direction is the seat longitudinal direction, and is formed in a substantially rectangular shape as seen in a front view. Further, the pair of convex beads 72 are formed at the base plate 66. The convex beads 72 are described later.

Figure 6:
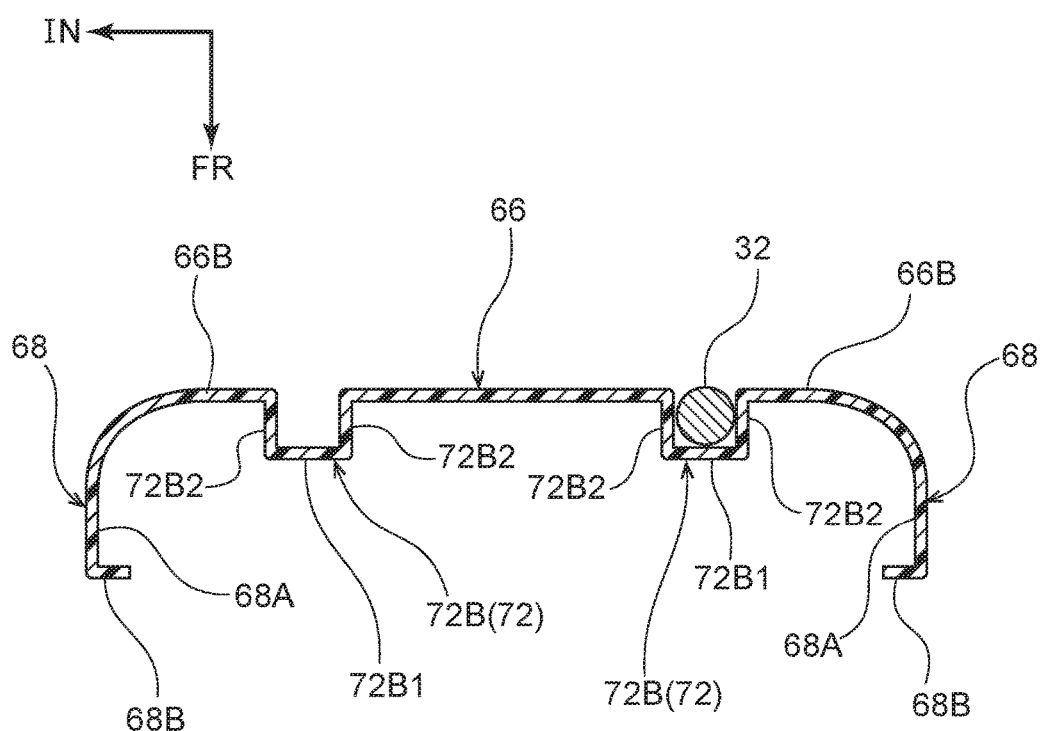
FIG. 6 is a cross-sectional view showing the state cut along line 6-6 of FIG. 5.

The side frames 68 extend in the seat vertical direction with an interval therebetween in the seat transverse direction. The side frames 68 of the present embodiment are formed integrally with the base plate 66 at the seat transverse direction both end portions of the base plate 66. Here, the side frames 68 respectively have bottom walls 68A that face one another and whose plate thickness directions are the seat transverse direction. The bottom walls 68A extend in the seat vertical direction from the upper end portion to the lower end portion of the base plate 66. At the upper end portion of the base plate 66, the bottom walls 68A are formed such that the width thereof in the seat longitudinal direction becomes gradually narrower toward the upper side of the seat. Further, side walls 68B extend-out from the front end portions of the bottom walls 68A toward the seat transverse direction inner side. On the other hand, as shown in FIG. 6, the rear end portions of the bottom walls 68A are connected to outer side end portions 66B that are at the seat transverse direction outer sides of the base plate 66. The connected portions of these outer side end portions 66B and side frames 68 are formed in substantial arc shapes. Further, the outer side end portions 66B of the base plate 66 form the side walls at the seat rear sides of the side frames 68.

As shown in FIG. 5, the under frame 70, which connects the lower end portions of the pair of side frames 68 in the seat transverse direction, is provided at the lower end portion of the seatback frame 64. The under frame 70 is structured to include a front wall 70A whose plate thickness direction is the seat longitudinal direction and that extends in the seat transverse direction, an upper wall 70B that extends-out toward the seat rear side from the upper end portion of the front wall 70A, and a lower wall 70C that extends-out toward the seat rear side from the lower end portion of the front wall 70A. Therefore, the under frame 70 is formed in a substantial U-shape that opens toward the seat rear side in a side sectional view that is seen from the seat transverse direction. Further, the both end portions in the seat transverse direction of the under frame 70 are joined to the lower end portions of the side frames 68, respectively.

(Structure of Convex Beads)

The pair of convex beads 72 that serve as reinforcing portions are provided integrally of resin with the base plate 66. The convex beads 72 respectively extend in the seat vertical direction, and, in the present embodiment, the convex beads 72 are formed by the base plate 66 being made to bulge-out toward the seat front side.

Each of the convex beads 72 is structured to include a bead upper portion 72A, a bead intermediate portion 72B, and a bead lower portion 72C. The bead upper portion 72A is positioned at an upper portion 66A of the base plate 66, and the upper end portion of the bead upper portion 72A is open. Further, the bead upper portion 72A extends in the seat vertical direction at a position that is offset toward the seat transverse direction outer side with respect to the seat transverse direction center of the base plate 66. Here, the bead upper portion 72A is structured to include a bottom wall 72A1 whose plate thickness direction is the seat longitudinal direction, and a pair of side walls 72A2 that extend toward the seat rear side from the transverse direction both end portions of the bottom wall 72A1. Therefore, the bead upper portion 72A is formed in a substantial U-shape that opens toward the seat rear side as seen in a plan sectional view viewed from the upper side of the seat.

Here, the upper end portions of the bead upper portions 72A are connected to headrest supports 69 that are made of metal and are for supporting the headrest 18. Concretely, the headrest supports 69 are formed substantially in the shapes of rectangular tubes, and are disposed with the length directions thereof being the seat vertical direction. The lower portions of the headrest supports 69 are fixed to the bead upper portions 72A in states of being placed within the cross-sections of the bead upper portions 72A. Examples of methods of fixing the headrest supports 69 and the bead upper portions 72A are a method of fixing by using an adhesive, and a method of fixing by using self piercing rivets (SPR) or the like. The upper portions of the headrest supports 69 extend further toward the seat upper side than the base plate 66, and this is a structure in which the headrest stays are inserted into the headrest supports 69.

The bead intermediate portion 72B extends-out toward the seat lower side from the lower end portion of the bead upper portion 72A. Concretely, the bead intermediate portion 72B is inclined toward the seat transverse direction outer side from the lower end portion of the bead upper portion 72A toward the seat lower side, as seen in a front view. The lower end portion of the bead intermediate portion 72B is positioned in a vicinity of the side frame 68.

The bead intermediate portion 72B is structured to include a bottom wall 72B1 whose plate thickness direction is the seat longitudinal direction, and a pair of side walls 72B2 that extend-out toward the seat rear side from the transverse direction both end portions of the bottom wall 72B1. Therefore, the bead intermediate portion 72B is formed in a substantial U-shape that opens toward the seat rear side as seen in a plan sectional view viewed from the seat upper side.

Here, as shown in FIG. 6, the inflator 32 is disposed within the bead intermediate portion 72B that structures the convex bead 72 that is at the seat left side. Concretely, the inflator 32 is disposed within a cross-section that is surrounded by the bottom wall 72B1 and the pair of side walls 72B2 at the bead intermediate portion 72B. Further, unillustrated stud bolts that project-out from the inflator 32 are inserted-through one of the side walls 72B2, and the inflator 32 is fastened to the bead intermediate portion 72B due to nuts being screwed-together with the stud bolts with this side wall 72B2 nipped therebetween. At this time, the orientation of the inflator 32 is set such that the gas jetting port 32A of the inflator 32 is positioned at the seat upper side.

The bead lower portion 72C extends-out toward the seat lower side from the lower end portion of the bead intermediate portion 72B, and is positioned at a lower portion 66C of the base plate 66. Further, the bead lower portion 72C is structured to include a bottom wall 72C1 whose plate thickness direction is the seat longitudinal direction, and a pair of side walls 72C2 that extend-out toward the seat rear side from the transverse direction both end portions of the bottom wall 72C1. Therefore, the bead lower portion 72C is formed in a substantial U-shape that opens toward the seat rear side as seen in a plan sectional view that is viewed from the seat upper side.

Here, the lower end portion of the bead lower portion 72C is connected to the connected portion of the side frame 68 and the under frame 70. Concretely, the bottom wall 72C1 at the lower end portion of the bead lower portion 72C is joined to the seat rear side end surface of the upper wall 70B and to the seat rear side end surface of the lower wall 70C of the under frame 70. Further, the side wall 72C2 at the seat transverse direction outer side of the bead lower portion 72C is made integral with the bottom wall 68A of the side frame 68. Namely, the side wall 72C2 at the seat transverse direction outer side of the bead lower portion 72C forms a portion of the bottom wall 68A of the side frame 68.

As described above, there is a state in which the upper portion (the upper portion 66A of the base plate 66) and the lower portion (the lower portion 66C of the base plate 66) of the seatback 64 are connected by the convex beads 72 that are formed at the base plate 66.

(Operation and Effects)

Operation of the present embodiment is described next.

The multidirectional airbag 30 of the present embodiment is structured as an integral bag body that is expanded at a region that includes the front of and at regions that include the left and right both sides the head portion H of the seated person D, and covers the head portion of the seated person D. Due thereto, due to the head portion H of the seated person D being covered by the multidirectional airbag 30 at the time of a collision of the vehicle, the head portion H of the seated person D can be restrained and protected with respect to collisions of various types of forms.

Further, in the vehicle occupant protecting device 10 of the present embodiment, the pair of convex beads 72 are provided at the base plate 66 that structures the seatback frame 64, and the seatback frame 64 is reinforced by these convex beads 72. Further, the convex beads 72 respectively extend in the seat vertical direction, and connect the upper portion and the lower portion of the seatback frame 64. Due thereto, the load, which is applied to the headrest 18 (the upper portion of the vehicle seat 12) at the time of inflation and expansion of the multidirectional airbag 30, can be transmitted well to the under frame 70 via the convex beads 72. As a result, displacement of the seatback 16 toward the seat rear side can be suppressed.

Moreover, in the present embodiment, the lower end portions of the bead lower portions 72C at the convex beads 72 are connected to the connected portions of the side frames 68 and the under frame 70. Therefore, load that is inputted to the convex beads 72 can be transmitted well to the side frames 68 and the under frame 70. Namely, load that is inputted to the seatback frame 64 can be dispersed effectively.

Still further, in the present embodiment, the inflator 32 is disposed within the cross-section of the convex bead 72. Due thereto, as compared with a structure in which the inflator 32 is disposed within the headrest 18, the position of the inflator 32 can be lowered, and the center of gravity of the vehicle seat 12 overall can be lowered. As a result, the moment around the connected portion of the seatback 16 and the seat cushion 14 is small, and displacement of the seatback 16 toward the seat rear side at the time of inflation and expansion of the multidirectional airbag 30 can be suppressed.

Further, at the time when the inflator 32 operates and gas is jetted-out from the gas jetting port 32A, reaction force that is applied to the inflator 32 can be received by the convex bead 72. Therefore, the reaction force from the inflator 32 is transmitted to the upper portion and the lower portion of the seatback frame 64 via the convex bead 72. As a result, the mounted state of the inflator 32 can be maintained good, as compared with a structure in which the inflator 32 is mounted to the general portion of the base plate 66.

Moreover, in the present embodiment, the gas jetting port 32A of the inflator 32 is provided at the end portion that is at the seat upper side. Therefore, the distance between the gas jetting port 32A and the multidirectional airbag 30 is short, as compared with a structure in which the gas jetting port 32A is provided at the end portion that is at the seat lower side of the inflator 32. Due thereto, even in a structure in which the multidirectional airbag 30 is accommodated within the headrest 18 and the inflator 32 is accommodated within the seatback 16, the gas that is jetted-out from the gas jetting port 32A can be supplied smoothly to the multidirectional airbag 30.

In particular, in a structure in which the inflator 32 is disposed at the interior of the convex bead 72 that has a substantially U-shaped cross-section as in the present embodiment, the flow path of gas can be disposed along the convex bead 72 from the gas jetting port 32A to the multidirectional airbag 30. As a result, the gas flow path interfering with parts at the periphery thereof can be suppressed.

Still further, in the present embodiment, the upper end portions of the convex beads 72 are connected to the headrest supports 69. Due thereto, the load that is applied to the headrest 18 at the time when the multidirectional airbag 30 inflates and expands is transmitted via the headrest supports 69 to the upper end portions of the convex beads 72, and can be transmitted along the convex beads 72 to the under frame 70. Namely, even in a case in which the multidirectional airbag 30 is accommodated within the headrest 18, displacement of the seatback 16 toward the seat rear side at the time of inflation and expansion of the multidirectional airbag 30 can be suppressed.

Further, the multidirectional airbag 30 of the present embodiment is accommodated within the module case 34 that structures the headrest 18. Therefore, at the vehicle occupant protecting device 10, as compared with a structure in which, for example, a gas supplying pipe that is disposed so as to surround the head portion of the vehicle occupant from above projects-out into the vehicle cabin at usual times, the appearance before operation is good while a vehicle occupant protecting ability that is the same extent or better is maintained. Further, longitudinal position adjustment, height adjustment, the reclining operation and the like of the vehicle seat 12 being impeded by the multidirectional airbag device 20 can be suppressed.

Second Embodiment

A second embodiment of the present disclosure is described next with reference to FIG. 7. Note that the second embodiment is a structure that is similar to the first embodiment except for the seatback frame, and therefore, only the seatback frame is described. Further, structures that are similar to those of the first embodiment are denoted by the same reference numerals, and explanation thereof is omitted as appropriate. The same holds for the third embodiment and the fourth embodiment that are described later.

Figure 7:
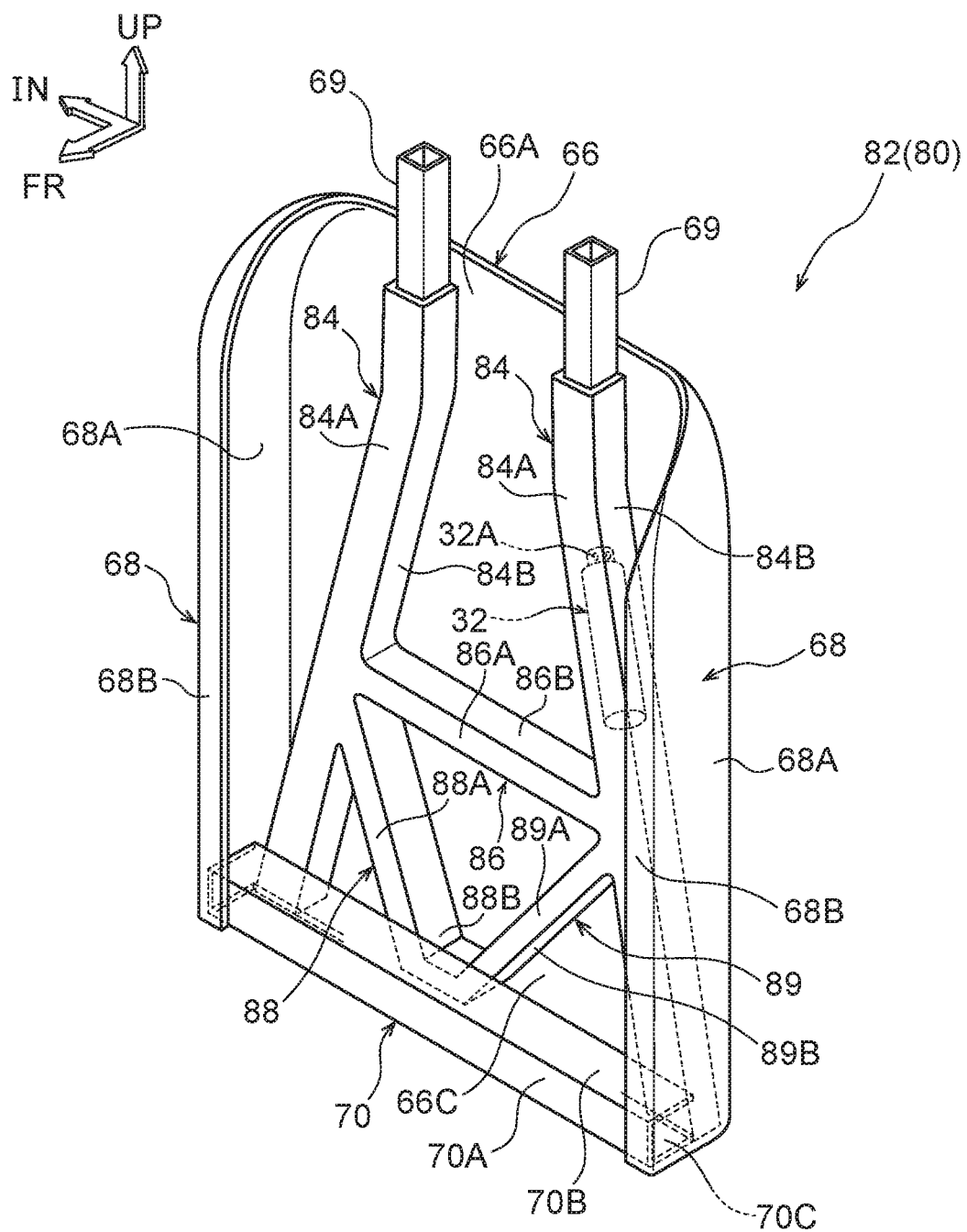
FIG. 7 is a perspective view showing a seatback frame and the inflator that structure a vehicle occupant protecting device relating to a second embodiment.

As shown in FIG. 7, a seatback frame 82 that structures a frame is provided at the interior of a seatback 80 of the present embodiment. The seatback frame 82 is structured so as to mainly include the base plate 66, the side frames 68 and the under frame 70. Here, a pair of convex beads 84 that serve as reinforcing portions are formed at the base plate 66, and these convex beads 84 are formed due to the base plate 66 being made to bulge-out toward the seat front side.

The convex beads 84 extend in the seat vertical direction at positions that are offset toward the seat transverse direction outer sides with respect to the seat transverse direction center of the base plate 66. Concretely, one of the convex beads 84 is disposed further toward the seat right side than the seat transverse direction center of the base plate 66, and extends obliquely toward the right and downward from the upper portion 66A of the base plate 66 toward the connected portion of the side frame 68 and the under frame 70. The other convex bead 84 is disposed further toward the seat left side than the seat transverse direction center of the base plate 66, and extends obliquely toward the left and downward from the upper portion 66A of the base plate 66 toward the connected portion of the side frame 68 and the under frame 70. Further, the upper end portions of the respective convex beads 84 are bent, and extend in the seat vertical direction so as to be coaxial with the headrest supports 69. In this way, the upper portion (the upper portion 66A of the base plate 66) and the lower portion (the lower portion 66C of the base plate 66) of the seatback frame 82 are connected by the pair of convex beads 84.

Here, each of the convex beads 84 is structured to include a bottom wall 84A whose plate thickness direction is the seat longitudinal direction, and a pair of side walls 84B that extend-out toward the seat rear side from the transverse direction both end portions of the bottom wall 84A. Therefore, the bead upper portion 72A is formed in a substantial U-shape that opens toward the seat rear side as seen in a plan sectional view viewed from the seat upper side. The bottom wall 84A at the lower end portion of the convex bead 84 is joined to the seat rear side end surface of the upper wall 70B and to the seat rear side end surface of the lower wall 70C of the under frame 70.

The inflator 32 is disposed within the cross-section that is surrounded by the bottom wall 84A and the pair of side walls 84B at the other convex bead 84. Concretely, the inflator 32 is disposed at the upper portion of the other convex bead 84, and unillustrated stud bolts that project-out from the inflator 32 are inserted-through one of the side walls 84B, and the inflator 32 is fastened to the convex bead 84 due to nuts being screwed-together with the stud bolts with this side wall 84B nipped therebetween. Here, the orientation of the inflator 32 is set such that the gas jetting port 32A is positioned at the seat upper side.

A first connecting bead 86, which extends in the seat transverse direction and connects the pair of convex beads 84, is provided at the intermediate portion in the seat vertical direction of the base plate 66. The first connecting bead 86 is formed due to the base plate 66 being made to bulge-out toward the seat front side, and is structured to include a bottom wall 86A whose plate thickness direction is the seat longitudinal direction, and a pair of side walls 86B that extend-out toward the seat rear side from the vertical direction both end portions of the bottom wall 86A.

A second connecting bead 88 and a third connecting bead 89 are formed beneath the first connecting bead 86 due to the base plate 66 being made to bulge-out toward the seat front side. The second connecting bead 88 extends obliquely leftward and downward from the connected portion of the convex bead 84 at the right side and the first connecting bead 86, toward the lower end portion of the base plate 66. Further, the second connecting bead 88 is structured to include a bottom wall 88A whose plate thickness direction is the seat longitudinal direction, and a pair of side walls 88B that extend-out toward the seat rear side from the transverse direction both end portions of the bottom wall 88A. On the other hand, the third connecting bead 89 extends obliquely rightward and downward from the connected portion of the convex bead 84 at the left side and the first connecting bead 86, toward the lower end portion of the base plate 66. Further, the third connecting bead 89 is structured to include a bottom wall 89A whose plate thickness direction is the seat longitudinal direction, and a pair of side walls 89B that extend-out toward the seat rear side from the transverse direction both end portions of the bottom wall 89A.

Here, the second connecting bead 88 and the third connecting bead 89 are connected at the lower end portion of the base plate 66. Therefore, when the seatback frame 82 is viewed from the front, a substantially triangular shape is formed by the convex bead 84 at the right side and the second connecting bead 88 and the under frame 70. Further, a substantially triangular shape is formed by the convex bead 84 at the left side and the third connecting bead 89 and the under frame 70. Moreover, a substantially triangular shape is formed by the first connecting bead 86 and the second connecting bead 88 and the third connecting bead 89.

(Operation and Effects)

Operation of the present embodiment is described next.

In the present embodiment, the three reinforcing portions that are substantially triangular are formed at the lower portion of the seatback frame 82. Therefore, the rigidity of the seatback frame 82 can be improved more as compared with the structure of the first embodiment. As a result, displacement of the seatback 80 toward the seat rear side at the time of inflation and expansion of the multidirectional airbag can be suppressed effectively. Other effects are similar to those of the first embodiment.

Third Embodiment

Figure 8:
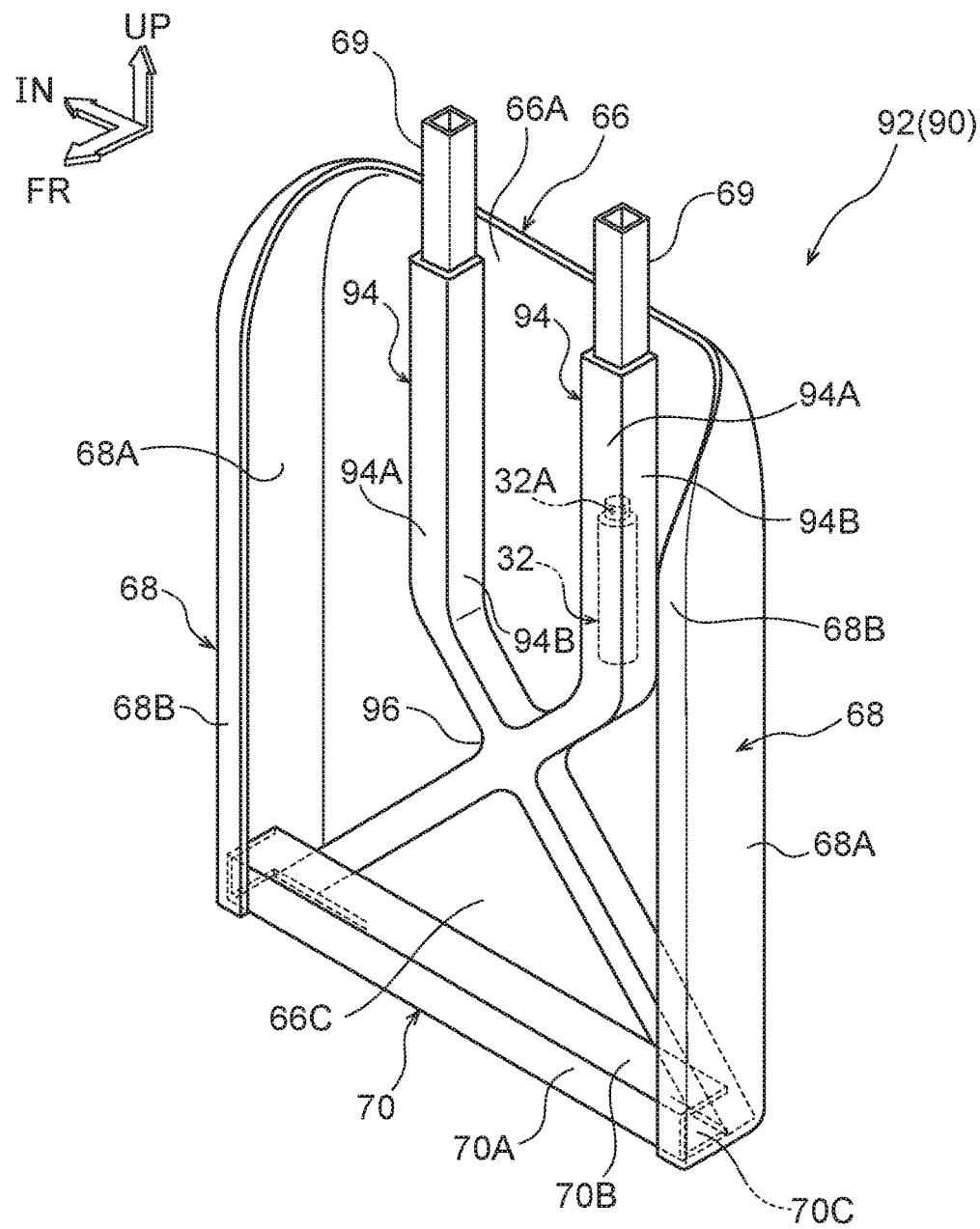
FIG. 8 is a perspective view showing a seatback frame and the inflator that structure a vehicle occupant protecting device relating to a third embodiment.

A third embodiment of the present disclosure is described next. As shown in FIG. 8, a seatback frame 92 that structures a frame is provided at the interior of a seatback 90 of the present embodiment. The seatback frame 92 is structured so as to mainly include the base plate 66, the side frames 68 and the under frame 70. Here, a pair of convex beads 94 that serve as reinforcing portions are formed at the base plate 66, and these convex beads 94 are formed due to the base plate 66 being made to bulge-out toward the seat front side.

The convex beads 94 extend in the seat vertical direction at positions that are offset toward the seat transverse direction outer sides with respect to the seat transverse direction center of the base plate 66. Concretely, one of the convex beads 94 is disposed further toward the seat right side than the seat transverse direction center of the base plate 66, and extends toward the seat lower side from the upper portion 66A of the base plate 66 to the seat vertical direction intermediate portion. Further, this convex bead 94 is bent toward the left side at the seat vertical direction intermediate portion of the base plate 66, and passes-through an intersection portion 96, and extends obliquely toward the left and downward toward the connected portion of the side frame 68 and the under frame 70.

The other convex bead 94 is disposed further toward the seat left side than the seat transverse direction center of the base plate 66, and extends toward the seat lower side from the upper portion 66A of the base plate 66 to the seat vertical direction intermediate portion. Further, this convex bead 94 is bent toward the right side at the seat vertical direction intermediate portion of the base plate 66, and intersects the one convex bead 94 at the intersection portion 96. Moreover, the other convex bead 94 extends obliquely toward the right and downward from the intersection portion 96 toward the connected portion of the side frame 68 and the under frame 70.

Each of the convex beads 94 is structured to include a bottom wall 94A whose plate thickness direction is the seat longitudinal direction, and a pair of side walls 94B that extend-out toward the seat rear side from the transverse direction both end portions of the bottom wall 94A. Therefore, the convex portion 94 is formed in a substantial U-shape that opens toward the seat rear side as seen in a plan sectional view viewed from the seat upper side. Further, the bottom wall 94A at the lower end portion of the convex bead 94 is joined to the seat rear side end surface of the upper wall 70B and to the seat rear side end surface of the lower wall 70C of the under frame 70. Further, at the intersection portion 96, the same flat surface is structured by the bottom wall 94A of the one convex bead 94 and the bottom wall 94A of the other convex bead 94.

The inflator 32 is disposed within the cross-section that is surrounded by the bottom wall 94A and the pair of side walls 94B at the other convex bead 94. Concretely, the inflator 32 is disposed further toward the seat upper side than the intersection portion 96 at the other convex bead 94. Unillustrated stud bolts that project-out from the inflator 32 are inserted-through one of the side walls 94B, and the inflator 32 is fastened to the convex bead 94 due to nuts being screwed-together with the stud bolts with this side wall 94B nipped therebetween. Therefore, the orientation of the inflator 32 is set such that the gas jetting port 32A is positioned at the seat upper side.

(Operation and Effects)

Operation of the present embodiment is described next.

In the present embodiment, by providing the intersection portion 96 and making the pair of convex beads 94 intersect one another, the rigidity of the seat transverse direction intermediate portion of the seatback frame 92 can be improved as compared with the first embodiment. Other effects are similar to those of the first embodiment.

Fourth Embodiment

Figure 9:
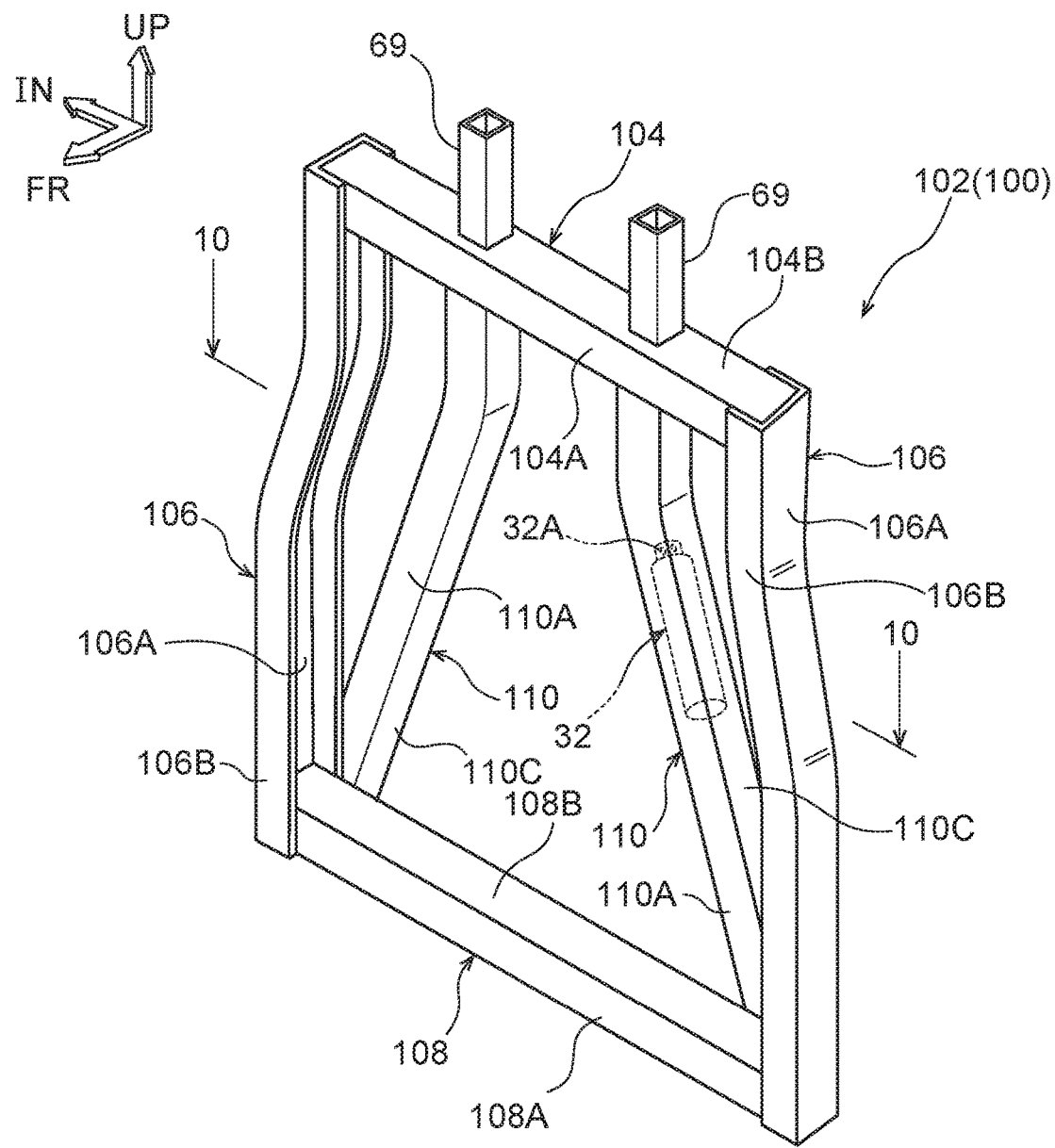
FIG. 9 is a perspective view showing a seatback frame and the inflator that structure a vehicle occupant protecting device relating to a fourth embodiment.

A fourth embodiment of the present disclosure is described next. As shown in FIG. 9, a seatback frame 102 that structures a frame is provided at the interior of a seatback 100 of the present embodiment. The seatback frame 102 is formed of metal, and is structured so as to mainly include an upper frame 104, side frames 106 and an under frame 108. Further, the upper frame 104 and the under frame 108 are connected in the seat vertical direction by connecting frames 110 that serve as reinforcing portions.

The upper frame 104 is structured to include a bottom wall 104A whose plate thickness direction is the seat longitudinal direction and that extends in the seat transverse direction, and a pair of side walls 104B that extend-out toward the seat rear side from the upper end portion and the lower end portion of the bottom wall 104A, respectively. Therefore, the upper frame 104 is formed in a substantial U-shape that opens toward the seat rear side as seen in a side sectional view viewed from the seat transverse direction. Further, the seat transverse direction both end portions of the upper frame 104 are joined to the upper end portions of the side frames 106, respectively.

The side frames 106 are provided as a pair with an interval therebetween in the seat transverse direction. The side frames 106 respectively extend in the seat vertical direction, and seat vertical direction intermediate portions of the side frames 106 are inclined toward the seat transverse direction outer sides while heading toward the seat lower side. Therefore, the lower portions of the side frames 106 are positioned further toward the seat transverse direction outer sides than the upper portions of the side frames 106. Further, each of the side frames 106 is structured to include a bottom wall 106A whose plate thickness direction is the seat transverse direction, and a pair of side walls 106B that extend-out toward the seat transverse direction inner side from the front end portion and the rear end portion of the bottom wall 106A, respectively. Therefore, the side frame 106 is formed in a substantial U-shape that opens toward the seat transverse direction inner side as seen in a plan sectional view viewed from the seat vertical direction.

The under frame 108 is disposed so as to span between the lower end portions of the side frames 106. The under frame 108 is structured to include a front wall 108A whose plate thickness direction is the seat longitudinal direction and that extends in the seat transverse direction, an upper wall 108B that extends-out toward the seat rear side from the upper end portion of the front wall 108A, and an unillustrated lower wall that extends-out toward the seat rear side from the lower end portion of the front wall 108A. Therefore, the under frame 108 is formed in a substantial U-shape that opens toward the seat rear side as seen in a side sectional view viewed from the seat transverse direction.

In this way, the seatback frame 102 of the present embodiment is formed in a substantially rectangular frame shape by the upper frame 104, the side frames 106 and the under frame 108. Further, the pair of headrest supports 69 are joined to a side wall 104B that is at the upper side of the upper frame 104.

The connecting frames 110 are formed substantially in the shapes of rectangular tubes, and extend in the seat vertical direction. Concretely, the upper end portions of the connecting frames 110 are respectively joined to the seat rear side end surfaces of the pair of side walls 104B of the upper frame 104, and extend toward the seat lower side from these upper end portions. Further, the connecting frames 110 are bent toward the seat transverse direction outer sides at portions thereof that are further toward the seat upper side than the seat vertical direction intermediate portions thereof, and, from these bent portions, are inclined toward the seat transverse direction outer sides while heading toward the seat lower side. Further, the lower end portions of the connecting frames 110 are joined to the side walls 106B that are at the rear sides of the side frames 106, at the connected portions of the side frames 106 and the under frame 108.

Figure 10:
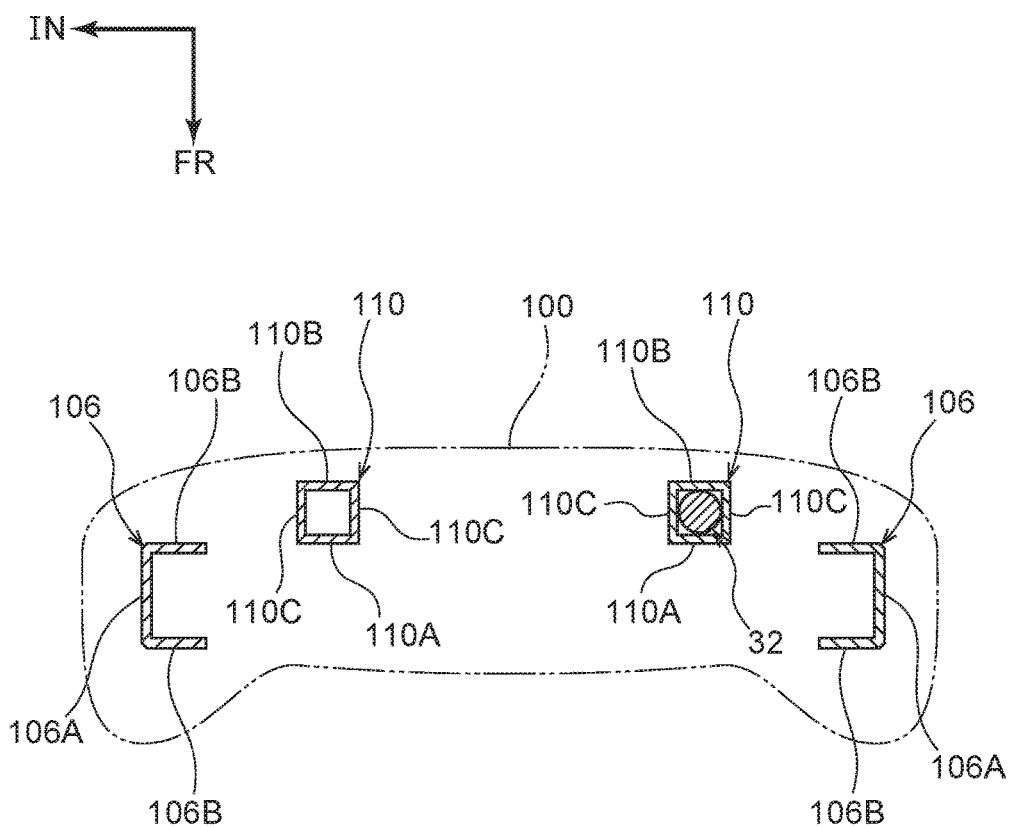
FIG. 10 is a cross-sectional view showing the state cut along line 10-10 of FIG. 9.

Here, as shown in FIG. 10, the connecting frame 110 has a front wall 110A and a rear wall 110B whose plate thickness directions are the seat longitudinal direction and that are disposed so as to face one another. Further, the connecting frame 110 is a cross-sectional structure having a pair of side walls 110C whose plate thickness direction is the seat transverse direction and that connect the front wall 110A and the rear wall 110B in the seat transverse direction. Therefore, in the present embodiment, one of the front wall 110A and the rear wall 110B corresponds to the "bottom wall" of the present disclosure.

The inflator 32 is disposed within the cross-section of the connecting frame 110 that is at the seat left side. The inflator 32 is disposed along the connecting frame 110 with the seat vertical direction being the axial direction thereof, and the orientation of the inflator 32 is set such that the gas jetting port 32A is positioned at the seat upper side.

(Operation and Effects)

Operation of the present embodiment is described next.

The seatback frame 102 of the present embodiment does not have the base plate 66 such as in the first embodiment, and is formed substantially in the shape of a rectangular frame. Even in such a structure, the connecting frames 110 extend in the seat vertical direction and connect the upper portion (the upper frame 104) and the lower portion (the under frame 108) of the seatback frame 102. Due thereto, load that is applied to the headrest at the time of inflation and expansion of the multidirectional airbag can be transmitted well to the under frame 108 via the connecting frames 110. As a result, displacement of the seatback 100 toward the seat rear side can be suppressed.

Further, in the present embodiment, the lower end portions of the connecting frames 110 are connected to the connected portions of the side frames 106 and the under frame 108. Therefore, load that is inputted to the connecting frames 110 can be transmitted well to the side frames 106 and the under frame 108. Namely, load that is inputted to the seatback frame 102 can be dispersed effectively.

Moreover, in the present embodiment, the inflator 32 is disposed within the closed cross-section of the connecting frame 110. Due thereto, at the time when the inflator 32 operates and gas is jetted-out from the gas jetting port 32A, reaction force that is applied to the inflator 32 can be received by the connecting frame 110. Therefore, reaction force from the inflator 32 can be transmitted via the connecting frame 110 to the upper portion and the lower portion of the seatback frame 102, and the mounted state of the inflator 32 can be maintained good.

Although the first embodiment through the fourth embodiment of the present disclosure have been described above, the present disclosure is not limited to the above-described structures, and can, of course, be implemented in various forms other than the above-described structures within a scope that does not depart from the gist thereof. For example, in the above-described first embodiment through third embodiment, the convex beads 72, 84, 94 that are formed at the base plate 66 are made to be the reinforcing portions, but the present disclosure is not limited to this. There may be a structure in which a frame, which is substantially U-shaped in cross-section, is joined to the seat front side surface of the base plate.

Further, in the above-described first embodiment through third embodiment, an upper frame is not provided, but the present disclosure is not limited to this and may be a structure that is provided with an upper frame. In this case, for example, in FIG. 5, an upper frame, which is substantially U-shaped in cross-section and whose seat rear side is open, may be disposed between the side frames 68, and the upper end portions of the convex beads 72 may be connected to this upper frame.

Moreover, in the above-described embodiments, the inflator 32 is disposed within the cross-section of the convex bead that is positioned at the left side, or within the cross-section of the connecting frame that is positioned at the left side, but the present disclosure is not limited to this. For example, the inflator 32 may be disposed within the cross-section of the convex bead that is positioned at the right side, or within the cross-section of the connecting frame that is positioned at the right side. Moreover, the inflators 32 may be disposed within the cross-sections of both of the pair of convex beads, or the inflators 32 may be disposed within the cross-sections of both of the connecting frames. If gas is supplied from the two inflators 32 to the multidirectional airbag, the inflation and expansion of the multidirectional airbag can be completed more rapidly.

Still further, the inflator may be mounted to the side frame. For example, in FIG. 6, if the inflator 32 is disposed within the cross-section that is surrounded by the bottom wall 68A of the side frame 68 and the pair of side walls (the side wall 68B and the outer side end portion 66B), at the time when the inflator 32 operates and gas is jetted-out from the gas jetting port 32A, the reaction force that is applied to the inflator 32 can be received at the side frame 68. Therefore, the reaction force from the inflator 32 is transmitted via the side frame 68 to the upper portion and the lower portion of the seatback frame 64, and the mounted state of the inflator 32 can be maintained good.

Further, in the above-described first embodiment through third embodiment, the seatback frame is formed of resin, and, in the fourth embodiment, the seatback frame is formed of metal. However, the material of the seatback frame is not particularly limited. For example, the seatback frame may be formed by both resin and metal materials.

Moreover, as shown in FIG. 1, the above-described embodiments illustrate examples in which the multidirectional airbag 30 is accommodated in the headrest 18, but the present disclosure is not limited to this. For example, there may be a structure in which the upper end portion of the seatback extends-out toward the seat upper side to the rear of the headrest, and the multidirectional airbag is accommodated in the upper end portion of this seatback. In this structure, the headrest can be removed from the seatback. Moreover, in a vehicle seat in which the headrest and the seatback are formed integrally, there may be a structure in which the multidirectional airbag is accommodated so as to span over the headrest and the seatback.

What is claimed is:

1. A vehicle occupant protecting device comprising:
  an airbag that is accommodated at an upper portion of a vehicle seat, that receives a supply of gas from an inflator and is inflated and expanded toward a seat front side, and that includes a front inflating portion, which is inflated at a seat front side with respect to a head portion of a vehicle occupant, and a pair of left and right lateral inflating portions, which are connected to the front inflating portion and are inflated at sides of the seat with respect to the head portion, the airbag being structured as an integral bag body that covers the head portion; and reinforcing portions that extend in a seat vertical direction at an interior of a seatback, and that connect an upper portion and a lower portion of a seatback frame that structures a frame of the seatback, wherein:
  the seatback frame is structured to include a pair of side frames, which are disposed with an interval therebetween in a seat transverse direction and which extend in the seat vertical direction, and an under frame that connects lower end portions of the side frames together in the seat transverse direction,
  lower portions of the reinforcing portions are connected to connected portions of the side frames and the under frame,
  each of the side frames and the reinforcing portions is structured to include a bottom wall and a pair of side walls that extend-out from both end portions of the bottom wall, and
  the inflator is disposed within a cross-section that is surrounded by the bottom wall and the pair of side walls at the side frame, or within a cross-section that is surrounded by the bottom wall and the pair of side walls at the reinforcing portion.

2. The vehicle occupant protecting device of claim 1, wherein:
  the inflator is disposed further toward a seat lower side than the airbag; and
  a gas jetting port is provided at a seat upper side end portion of the inflator.

3. The vehicle occupant protecting device of claim 1, wherein the reinforcing portion includes a substantially triangular portion at a lower portion of the seatback frame.

4. The vehicle occupant protecting device of claim 1, wherein the reinforcing portion includes an intersection portion.

5. A vehicle occupant protecting device comprising:
  an airbag that is accommodated at an upper portion of a vehicle seat, that receives a supply of gas from an inflator and is inflated and expanded toward a seat front side, and that includes a front inflating portion, which is inflated at a seat front side with respect to a head portion of a vehicle occupant, and a pair of left and right lateral inflating portions, which are connected to the front inflating portion and are inflated at sides of the seat with respect to the head portion, the airbag being structured as an integral bag body that covers the head portion; and
  reinforcing portions that extend in a seat vertical direction at an interior of a seatback, and that connect an upper portion and a lower portion of a seatback frame that structures a frame of the seatback,
  wherein:
    the airbag is accommodated within a headrest;
    headrest supports that support the headrest are provided at an upper portion of the seatback frame; and
    upper end portions of the reinforcing portions are connected to the headrest supports.

6. The vehicle occupant protecting device of claim 5, wherein the reinforcing portion includes a substantially triangular portion at a lower portion of the seatback frame.

7. The vehicle occupant protecting device of claim 5, wherein the reinforcing portion includes an intersection portion.

* * * * *